US009110956B2

United States Patent
Hobbs

(10) Patent No.: US 9,110,956 B2
(45) Date of Patent: Aug. 18, 2015

(54) INTEGRATION OF STATISTICAL LANGUAGES FOR REPORTING

(71) Applicant: SAP SE, Walldorf (DE)

(72) Inventor: Godfrey Hobbs, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/650,496

(22) Filed: Oct. 12, 2012

(65) Prior Publication Data
US 2014/0108396 A1    Apr. 17, 2014

(51) Int. Cl.
*G06F 17/30*    (2006.01)

(52) U.S. Cl.
CPC ................. *G06F 17/30536* (2013.01)

(58) Field of Classification Search
CPC ............ G06F 17/30864; G06F 17/30867; G06F 17/30011; G06F 17/3071; G06F 17/598; G06F 17/30705; G06F 17/30265; G06F 17/2247; G06F 17/2705; G06F 17/272; G06F 17/3089; G06F 17/30067; G06F 17/30286; G06F 17/30595; G06F 8/30; G06F 9/45512; G06F 17/30536; G06Q 10/10; G06Q 30/02; F06F 11/3692

USPC ......... 707/736, 737, 755, 756, 760; 717/125, 717/115

See application file for complete search history.

(56) References Cited

U.S. PATENT DOCUMENTS

| 5,870,464 | A  | * | 2/1999  | Brewster et al. | ............... | 379/219 |
| 2003/0065986 | A1 | * | 4/2003  | Fraenkel et al. | ................ | 714/47 |
| 2005/0177595 | A1 | * | 8/2005  | Krieg et al. | ................ | 707/104.1 |
| 2006/0187849 | A1 | * | 8/2006  | Hamedi | ......................... | 370/252 |
| 2007/0120857 | A1 | * | 5/2007  | Patel et al. | ..................... | 345/440 |
| 2011/0246135 | A1 | * | 10/2011 | Chen | ............................ | 702/179 |

* cited by examiner

*Primary Examiner* — Thu-Nguyet Le
(74) *Attorney, Agent, or Firm* — Dilworth IP LLC

(57) ABSTRACT

Methods and systems for integrating the output generated by a statistical language script into a report of a reporting application. In some implementations a uniform resource identifier may include a hostname, a port, a location of the statistical language script, and one or more parameter names and associated values. The script may be sent to a statistical programming language interface. The statistical programming language interface may generate an output based on the script and using data from a database. The output may be sent to the reporting application for inclusion within a report.

20 Claims, 5 Drawing Sheets

```

# Args:
#   numOfClusters: a scalar value for number of clusters

data(iris);
attach(iris);
cl<-kmeans(subset(iris, ,select=c("Sepal.Length",
"Petal.Length")),numOfClusters);
plot(Sepal.Length,Petal.Length,
     col=cl$cluster,ylim=c(1,8),xlim=c(4,8),main="K-
Means");
dev.off()
```

INTEGRATION OF STATISTICAL LANGUAGES FOR REPORTING

BACKGROUND

Statistical languages may be used to model data, data mining, and/or other uses. Examples of such statistical languages include R, S, Maple™, Mathematica®, MATLAB, matplotlib, Octave, Python™ with Numpy, Python™ with SciPy, or the like. These statistical languages may be used to generate graphical representations of data beyond the capabilities of languages that query a database. The graphical representations may be utilized by a user to verify statistical modeling of data. For example, a graphical representation of a k-means clustering may be generated and visually validated by a user. If the generated graphical representation does not appear to fit the expected analysis, parameters of the algorithm may be adjusted to improve the statistical analysis of the data.

A number of reporting applications are available to generate reports for a variety of business purposes. Such reports may be utilized to summarize accounting information, report on product sales, etc. Such reporting products may utilize data from a database to generate some of the information within a report. Such data may be requested using a query, such as through SQL or the like, to return the desired data. The reporting applications may then use the returned query result to populate data tables, generate graphs, or the like.

SUMMARY

One implementation relates to a method for integrating an output of a statistical language script for a reporting application. The method may include receiving a location of the statistical language script and one or more values for one or more script parameters. The method may include associating the statistical language script and the values with a uniform resource identifier. The method may include modifying the script to associate the script parameters with the values and outputting the statistical language script to a statistical programming language interface. An output from the statistical programming language interface may be received and associated with a report.

In another implementation, a computer-implemented method for presenting a graphical output of a statistical language script with a report may include associating a template within the report. A location of the statistical language script may be identified and the script may be parsed for one or more script parameter names. A value for each of the parameter names may be identified. A location, such as a hostname and port, of a statistical programming language interface may be identified. The hostname, port, location of the statistical language script, and the script parameter names and values may be associated with a uniform resource identifier. The statistical language script may be modified to associate the parameter names with the values and output to a statistical programming language interface. A graphical output from the statistical programming language interface may be received and associated with the template within the report.

In yet another implementation, a system may include a tangible computer-readable storage device with instructions and one or more processors for executing the instructions. The instructions may perform an operation of associating a template within a report and identifying a location of a statistical language script. The script may be parsed for one or more script parameter names and a value may be identified for each of the script parameter names. A location, such as a hostname and port, for a statistical programming language interface may be identified. The hostname, port, location of the script, and the parameter names and values may be associated with a uniform resource identifier. The script may be modified to associate the script parameter names and values and outputted to the statistical programming language interface. A graphical output from the statistical programming language interface may be received and associated with the template.

BRIEF DESCRIPTION OF THE DRAWINGS

Various embodiments taught herein are illustrated by way of example, and not by way of limitation, in the figures of the accompanying drawings, in which.

Figure 1:
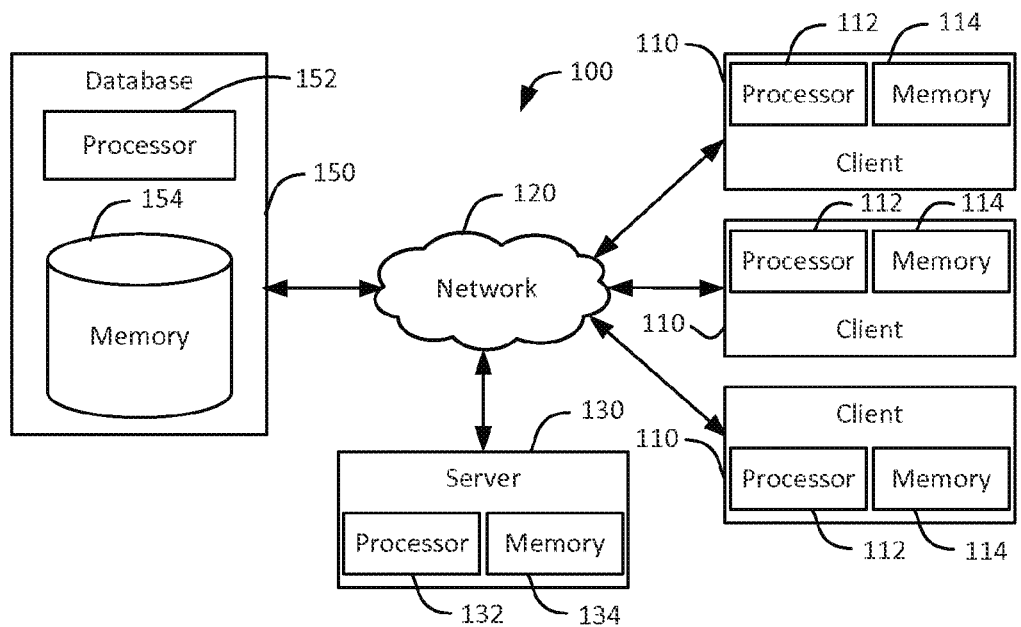
FIG. 1 is a block diagram of an example environment for a system.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

In some situations, businesses utilize reporting applications, such as Crystal Reports® or the like, to generate reports on various data from a database. For instance, a financial report may be generated to show sales figures of the company, inventories of products, profit margins, etc. The data used for such reports may be stored in a database that is accessible to the reporting application. In some instances, such data may be retrieved from the database via a query to return values stored in the database, e.g., via SQL or other query-based programming languages. However, such query-based programming languages may have limited capabilities for analyzing the data stored in the database. In addition, some reporting may utilize data stored in NO SQL (Not Only SQL) sources.

In some instances, a statistical programming language, such as R, S, Maple™, Mathematica®, MATLAB, matplotlib, Octave, Python™ with Numpy, Python™ with SciPy, or the like, may be used to analyze the NO SQL data and, in some instances, provide a graphical representation of the analyzed data. Such statistical languages may be able to analyze large amounts of data (e.g., "big data") and provide useful feedback to a user, such as a statistician, data miner, or data scientist. By way of example only, one such graphical representation may be a k-means clustering of data to organize data into n data entries into k clusters such that each data entry is in a cluster with the nearest mean. Utilizing a statistical programming language, millions, billions, trillions, etc.

of data entries may be analyzed and visualized. Such visualization of data may be useful for market analysis, product success predictions, etc. Of course, it should be understood that the foregoing is merely an example.

While such graphical representations may be useful independently, in some instances, integration of such graphical representations or outputs into a report via a reporting application may be useful. However, the output from such statistical programming languages may not be readily importable into a reporting application. Accordingly, integration of the output from a statistical programming language into reporting applications may be useful to generate cohesive reports that may utilize the advantages of the statistical programming languages while generating a readily consumable report for a business. In addition, the integration of the output from a statistical programming language into reporting applications may allow report designers to effectively leverage existing reporting and business intelligence infrastructures and assets to include R-based (or other statistical language-based) analysis of big data and/or SAP HANA™ Data.

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

I. Overview

Referring to FIG. 1, a block diagram illustrates an example system 100 having a database 150 that may be in communication with one or more clients 110 via a network 120. In some instances, a server 130 may be in communication with clients 110 and/or database 150, though this is optional. Database 150 may comprise any number of different types of electronic devices configured to communicate via network 120 (e.g., a laptop computer, a desktop computer, a tablet computer, a smartphone, a server, combinations thereof, etc.). Database 150 may include a processor 152 and a memory 154, i.e., a processing circuit. Processor 152 may include a microprocessor, ASIC, FPGA, etc., or combinations thereof. Memory 154 may include, but is not limited to, electronic, optical, magnetic, or any other storage or transmission device capable of storing data and/or providing the processor with program instructions. Memory 154 may include a floppy disk, CD-ROM, DVD, magnetic disk, memory chip, ROM, RAM, EEPROM, EPROM, flash memory, optical media, or any other suitable memory from which the processor can read instructions. In some versions, memory 154 may include a plurality of storage mediums and/or may store very large amounts of data, for example data tables comprising millions, billions, trillions, etc. of rows of data. In some versions, database 150 may include a plurality of electronic devices, such as cloud storage, a server bank, or the like. Of course other databases 150 may be used as well.

Network 120 may be any form of computer network that relays information between client 110, database 150, and/or server 130. For example, network 120 may include the Internet and/or other types of data networks, such as a local area network (LAN), a wide area network (WAN), a cellular network, satellite network, or other types of data networks. Network 120 may also include any number of computing devices (e.g., computer, servers, routers, network switches, etc.) that are configured to receive and/or transmit data within network 120. Network 120 may further include any number of hardwired and/or wireless connections. For example, clients 110 may communicate wirelessly (e.g., via WiFi, cellular, radio, etc.) with a transceiver that is hardwired (e.g., via a fiber optic cable, a CAT5 cable, etc.) to other computing devices in network 120.

Clients 110 may be of any number of different types of user electronic devices configured to communicate via network 120 (e.g., a laptop computer, a desktop computer, a tablet computer, a smartphone, a server, combinations thereof, etc.). Clients 110 may include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions.

Server 130 may also be any number of different types of electronic devices configured to communicate via network 120 (e.g., a laptop computer, a desktop computer, a tablet computer, a smartphone, a server, combinations thereof, etc.). Server 130 may include a processor 132 and a memory 134, i.e., a processing circuit. Memory 134 may store machine instructions that, when executed by processor 132 cause processor 132 to perform one or more of the operations described herein. Processor 132 may include a microprocessor, ASIC, FPGA, etc., or combinations thereof. Memory 134 may include, but is not limited to, electronic, optical, magnetic, or any other storage or transmission device capable of providing processor 132 with program instructions. Memory 134 may include a floppy disk, CD-ROM, DVD, magnetic disk, memory chip, ROM, RAM, EEPROM, EPROM, flash memory, optical media, or any other suitable memory from which processor 132 can read instructions.

In some versions, system 100 may be implemented and/or integrated into an enterprise architecture. Of course system 100 is merely an example and other systems may be used with the methods and processes described herein.

II. Integration of Statistical Language for Reporting

As discussed above, it may be useful to integrate a graphical output that takes advantage of the capabilities of a statistical programming language into a reporting application to provide a cohesive report for businesses.

A. Overview of Statistical Language Processing

Figure 2:
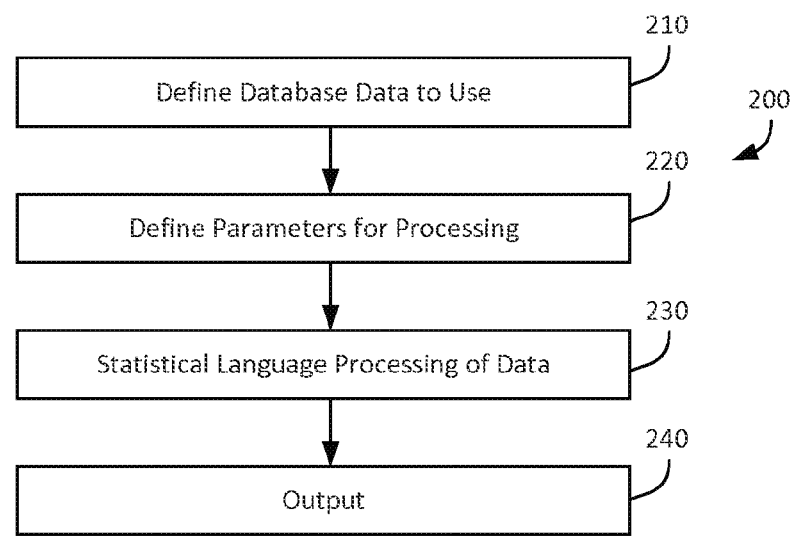
FIG. 2 is a flow diagram of a statistical language script configured to process data from a database.
Figures 3, 4:
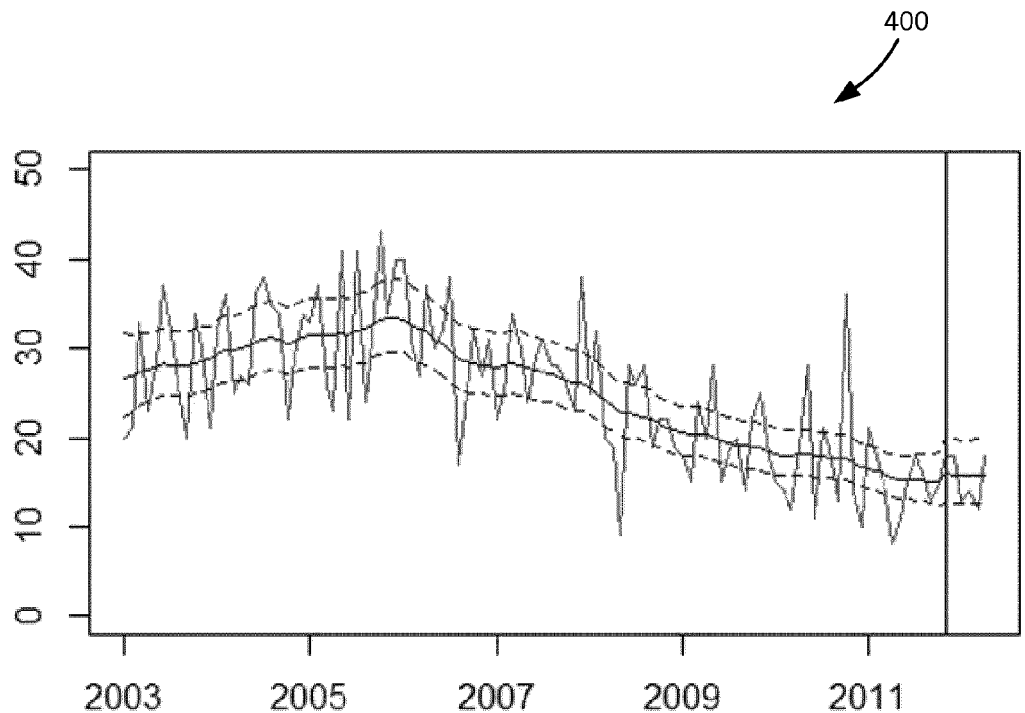
FIG. 3 is an example statistical language script.
FIG. 4 is an example graphical output of a statistical language script.

FIGS. 2-4 generally depict a process of utilizing database data to generate an output using a statistical programming language. FIG. 2 depicts a flow diagram of a process 200, FIG. 3 depicts an example of a statistical language script 300, and FIG. 4 depicts an example graphical output 400 that may be generated by a statistical language script. It should be understood that process 200, script 300, and graphical output 400 are merely examples.

Referring initially to FIG. 2, a flow diagram depicts an overview of a process 200 by which a statistical language script may utilize data from a database, such as database 150 shown in FIG. 1, to generate an output. The database data to be analyzed may initially be defined by one or more parameters (block 210). For example, the database data to be analyzed may include all or part of the data within the database. For example, referring briefly to FIG. 3, a database entitled "iris" is loaded and made available to script 300 via the data( ) and attach( ) functions. In the example shown, the database data 310 to be analyzed is a subset of the iris database and is defined in the k-means clustering function by "subset(iris, select=c("Sepal.Length", "Petal.Length"))." In some instances, the parameters that define the data of the database to be used may be set in the reporting application and converted into variables for a statistical language script, as will be described in greater detail below. Merely examples of such parameters that may be used to define the database data to be analyzed may include temporal, quantity, quality, rate, and/or other parameters. It should be understood that a plurality and/or variety of parameters may be used or, in some instances, no parameters may be used to define the data of the database to be analyzed.

Referring back to FIG. 2, the parameters for processing the data via the script may also be defined (block 220). By way of example only, one example of a parameter 320 may be the number of clusters for a k-means clustering script as shown in FIG. 3. In some instances, the parameters 320 for processing the data may be set in the reporting application and included in the associated syntax for a statistical language script, as will be described in greater detail below. It should be understood that a plurality and/or variety of parameters may be used or, in some instances, no parameters may be defined for processing the data.

The statistical programming language may then process the defined database data in accordance with one or more parameters (block 230 of FIG. 2). In the example shown in FIG. 3, script 300 may apply a k-means clustering algorithm to the defined data 310 using a defined number of clusters in accordance with parameter 320. While k-means clustering is used as an example, it should be understood that script 300 may be configured for any other statistical analysis of data.

The statistical language script may then generate an output (block 240 of FIG. 2). The output may be a graphical representation of the analyzed data, a scalar value, or any other output based on the configuration of the statistical language script. For instance, a plot may be generated via script 300 via a plot function 330 to graphically depict the results of the k-means clustering of FIG. 3. One example of a graphical output 400 is shown in FIG. 4, though it should be understood this graphical output is not the result of script 300. Graphical output 400 may comprise a raster format image, such as a JPEG, TIFF, PNG, GIF, BMP, IMG, and/or any other raster format image. Of course the foregoing are merely examples and other outputs may be generated by the statistical language script.

B. Overview of Integration of Statistical Language for Reporting

While the foregoing demonstrates a general overview of an implementation of a statistical language and an example output of the statistical programming language, in some instances it may be useful to integrate the output from the statistical programming language into a reporting application.

Figure 5:
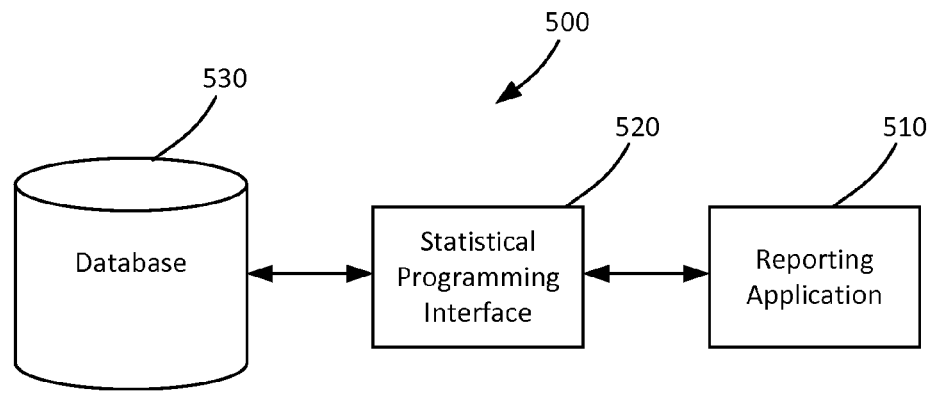
FIG. 5 is a block diagram of a system for integrating an output from a statistical language script into a reporting application.
Figure 9:
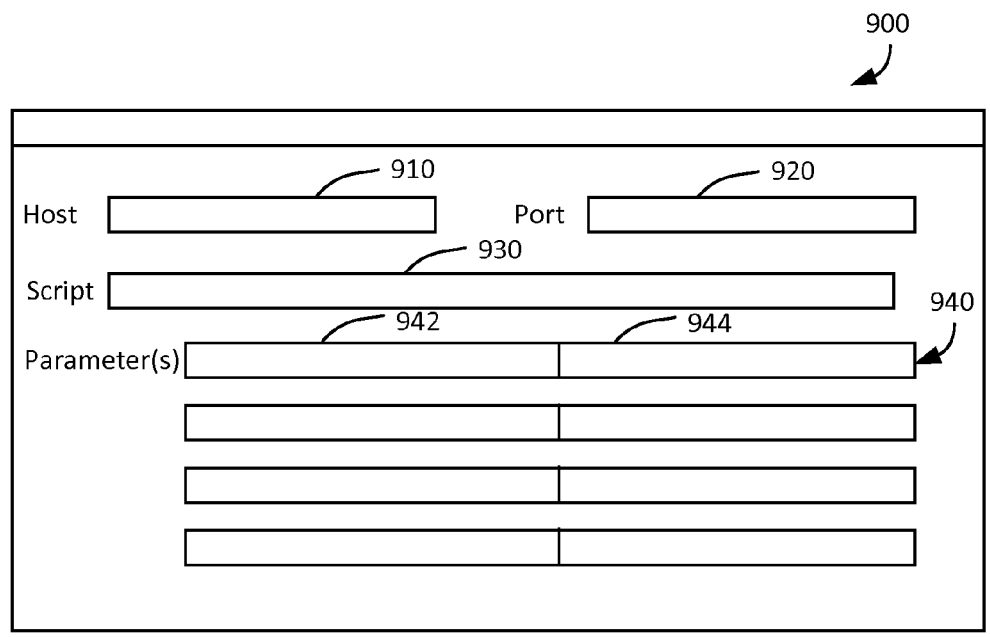
FIG. 9 is an example of a user interface.

FIG. 5 depicts a block diagram overview of an example system 500 for integrating an output from a statistical programming language for a reporting application 510. In the present example, reporting application 510 may comprise a user interface with which a user may specify parameters, specific scripts, server information (e.g., hostname and port), and/or other data that may be used with the statistical programming language and/or for executing a script for the statistical programming language. An example of such a user interface 900 is shown in FIG. 9 and will be described in greater detail below. A report may be generated by the reporting application 510. A report is a document that includes information automatically retrieved from a data source where the information is structured in accordance with a report schema. The schema specifies the form in which the information should be presented including how it should be sorted, grouped, further filtered, values calculated, and the like. Reporting application 510 may be configured to retrieve the designated script, specify a server having a statistical programming language interface 520, and prepend one or more pairs of parameter names and values to the script, as will be described in greater detail below in reference to FIG. 7. One example of a reporting application 510 may include Crystal Reports®, though other reporting applications may be used as well.

The script and any associated inputs may be communicated to the statistical programming language interface 520. Statistical programming language interface 520 may be configured to receive the output script from reporting application 510, fetch the relevant data from a database 530, process the data in accordance with the script, generate and output (such as graphical output 400 shown in FIG. 4), and return the generated output to the reporting application 510. The foregoing processes will be described in greater detail below. Examples of such statistical programming language interfaces may include Rserve, JRI, and R Caller, though it should be understood that other statistical programming interfaces may be used as well. Of course other processes and/or configurations for statistical programming language interface 520 may be implemented.

Database 530 may be configured in a similar manner as database 150 described above. Database 530 may include a plurality of storage mediums and/or may store very large amounts of data, for example data tables comprising millions, billions, trillions, etc. of rows of data. In some versions, database 530 may include a plurality of electronic devices, such as cloud storage, a server bank, or the like.

In some versions, reporting application 510, statistical programming language interface 520, and database 530 may be on a single device or one or more of the foregoing may be associated with one or more devices. For example, a first server may include database 530, a second server may host statistical programming language interface 520, and a client may host reporting application 510. Thus, a user of reporting application 510 on a client may transmit a script to the second server hosting statistical programming language interface 520 for it to retrieve and process data from database 530 from the first server. An output from the statistical programming language interface 520 may then be returned to reporting application 510 for use in a report or other content. Thus, reporting application 510 may not need to access or process data from database 530 while still being able to present an output from the data of database 530. In other implementations, the reporting application 510 may make separate but complementary use of data of database 530. Of course the foregoing is merely an example and other configurations may be implemented.

System 500 may be utilized to include a graphical output generated by a statistical programming language to be displayed in a report generated by reporting application 510 and/or to include a scalar output from a statistical programming language in a report generated by reporting application 510. In some instances, the style of the report may be passed to the statistical processing language such that the graphical output may be generated to include a substantially similar style to the style of the report. Examples of parameters of the style that may be passed include colors, fonts, textures, etc. The foregoing will be discussed in greater detail below.

C. Example Uniform Resource Indicator for Integrating a Statistical Language into a Reporting Application As discussed in the previous section, reporting application 510 of FIG. 5 may be configured to retrieve the designated script, specify a server having a statistical programming language interface 520, and specify values for one or more parameters to be prepended to the script. One example of how reporting application 510 may be configured to accomplish the foregoing aspects may be to provide a uniform resource indicator (URI).

Figure 6:
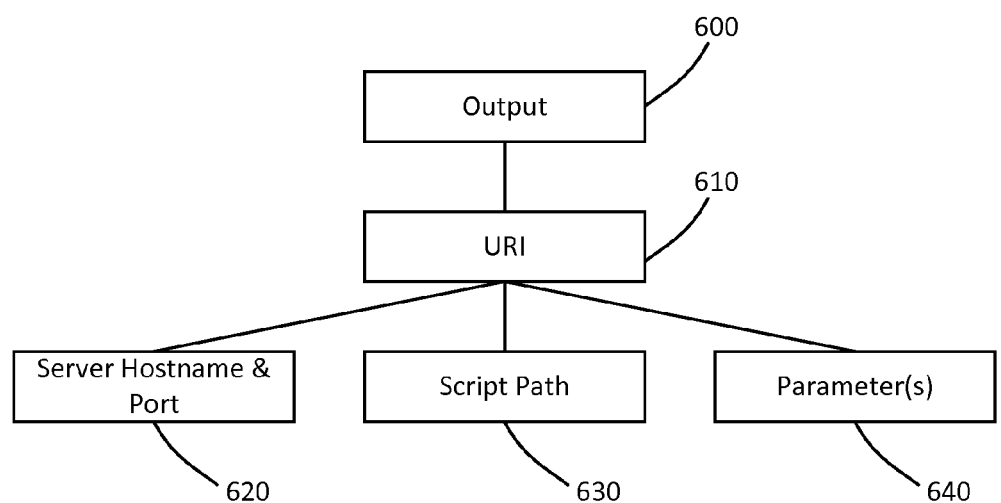
FIG. 6 is a block diagram of an example uniform resource identifier.

FIG. 6 depicts an example overview of such a URI 610 such that an output 600 may be included in a report generated by a reporting application, such as reporting application 510. In the present example, the URI 610 includes components for a server hostname and port 620, a script path for the statistical language script 630, and one or more parameter names and values 640. One example of a URI 610 for the R statistical programming language may include the following:
R:\\<hostname>:<port>\<script_path>?<parameter_name_1>=<parameter_value_1>&<para meter_name_2>=<parameter_value_2> . . . <parameter_name_n>=<parameter_value_n> In the foregoing, <hostname> is the server hostname having the statistical programming language interface, such as Rserve, <port> is the port of the server for the statistical programming language interface, <script_path> is the location of the statistical language script, and <parameter_name_1>=<parameter_value_1> through <parameter_name_n>=<parameter_value_n> are the various parameter names and values to be utilized by the statistical language script to analyze the data.

In some instances, <hostname>, <path>, and <script_path> may located on a single device, in others <hostname> and <path> may be on a first device while <script_path> is on a second device. In some instances, the device running the reporting application may be on still a third device. Elements <hostname>, <path>, and <script_path> may be manually modified in the foregoing URI 610 or <hostname>, <path>, and <script_path> may be determined utilizing a wizard or other user interface, as will be discussed in greater below in reference to FIG. 9.

In some versions, one or more parameters names may be determined by the statistical language script. For example, the statistical language script may include a parameter documentation such as:

```
# Args:
#   numOfClusters: a scalar value for number of clusters

```

Such that the reporting application, for example reporting application 510 of FIG. 5, may parse the statistical language script for these documented parameters for which the user is to specify values. Of course, more than one parameter may be specified in the statistical language script. In other versions, the parameters may be predetermined for a given script such that the reporting application need not parse the statistical language script. For example, reporting application may include a set of predetermined scripts and a set of associated parameters for each script. Of course still other configurations for the reporting application, statistical language scripts, and/or documented parameters may be implemented. The parameter names and/or values 640 may be manually modified in the foregoing URI 610 or parameter names and/or values 640 may be determined utilizing a wizard or other user interface, as will be discussed in greater below in reference to FIG. 9.

Of course the foregoing URI 610 is merely an example and other URIs for other statistical programming languages may be used as well. Crystal Reports® and other reporting applications have report parameters which are used for purposes such as filtering, formatting, calculations, and the like. Filtering is achieved by dynamically updating the report's SQL Select clause to include parameter values. Crystal Reports® parameters and Crystal Reports® context-aware formula language provides an interactive and feature rich reporting experience.

In some implementations, the URI 610 may be an output after evaluating a report formula of the reporting application 510. Accordingly, in some versions, the base of URI 610 may be combined with one or more report formula expressions and formula functions of the reporting application (e.g., a URI=BaseURI+report formula expressions). For example, evaluating the report formula of
"R:\\C:\scripts\getTimeSeriesForcast.R?epochtime="+currentDate( ) may result in a URI of R:\\C:\scripts\getTimeSeriesForcast.R?epochtime=1338106519, where 1338106519 is the current date returned by the report formula expression containing the formula function of "currentDate( )." Similarly, evaluating the report formula of
"R:\\C:\scripts\getTimeSeriesForcast.R?epochtime="+?currentDateParameter may result in a URI of R:\\C:\scripts\getTimeSeriesForcast.R?epochtime=1338106519, where 1338106519 is the value of the report parameter currentDateParameter. The foregoing may allow a user viewing the report to modify the value of currentDateParameter via the same familiar report application prompting features, such as List of values, edit masking, parameter grouping and parameter dependencies used for existing report parameters.

D. Example Process for Integrating Statistical Language Output into Reporting

Figure 7:
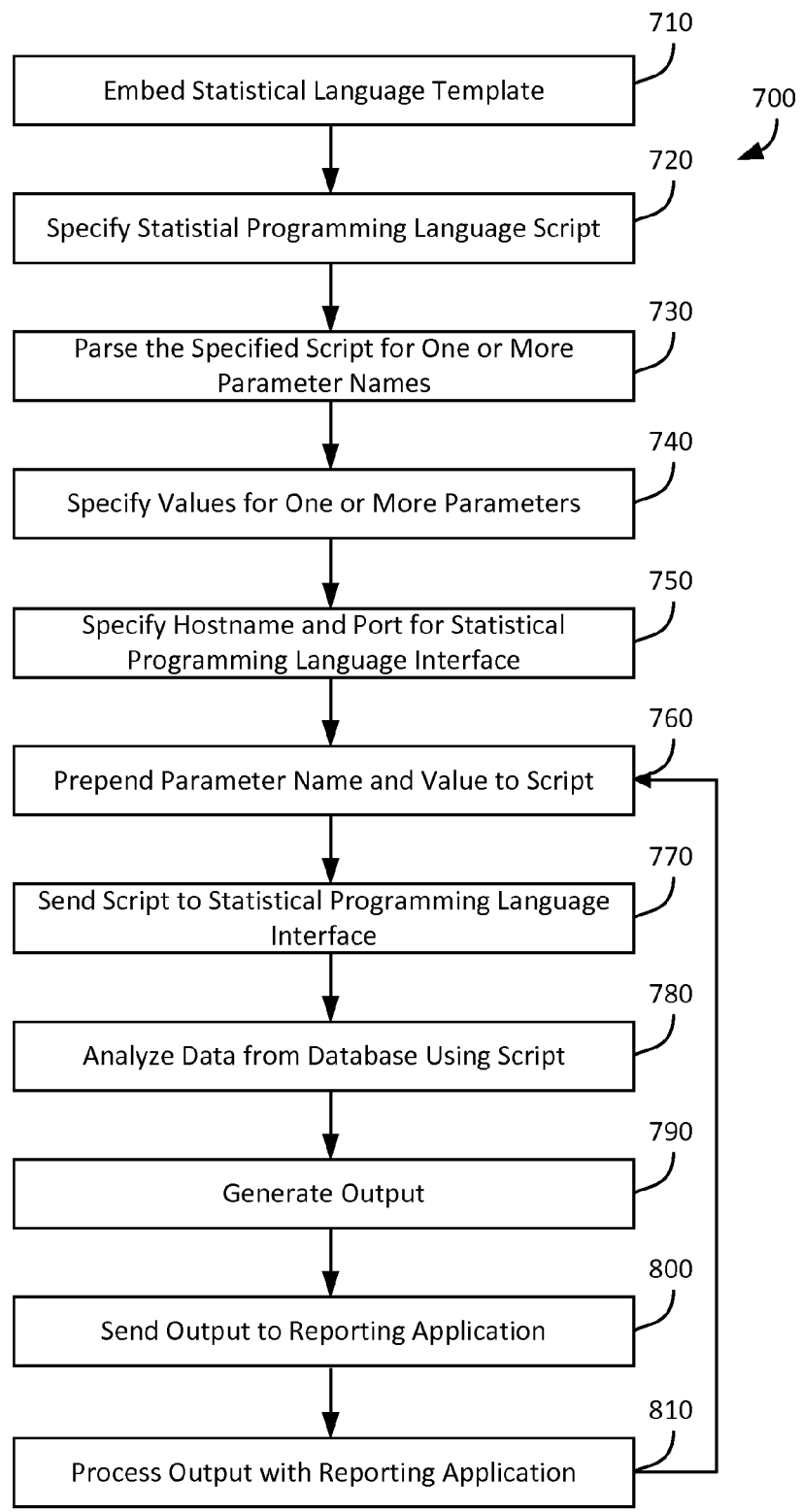
FIG. 7 is a flow diagram of a process for integrating an output from a statistical language script into a reporting application.

FIG. 7 depicts an example process 700 for integrating the output of a statistical language script into a report for a reporting application. In some implementations, a statistical language template may be selected and embedded in a report using a reporting application, such as reporting application 510 of FIG. 5, (step 710). The statistical language template may simply be a placeholder object to be associated with a statistical language script through user provided inputs, such as those received in response to a series of prompts, and which is then inserted into a portion of the report definition hierarchy, and thus the report document, where the output of the statistical language script is to be located. By way of example only, such a statistical language template may include a dynamic image for Crystal Reports® that is positioned within the report definition hierarchy. When the report is rendered, the specified parameter values, as will be discussed below, may be evaluated on-demand. Such on-demand context aware evaluation may enable context specific graphical outputs to be generated. One example of such a context specific graphical output may be a group level graphical output where one or more script parameters and/or report formulas are associated with the report's group level information, as will be discussed in greater detail herein.

In some implementations, a statistical language script, such as script 300 shown in FIG. 3, may be specified for the statistical language template (step 720). As noted above, specifying the statistical language script may be done manually and/or via a wizard or other user interface. For example, the user may manually enter the path for the specified script into the URI, such as URI 610 described above. In some versions, a specific statistical language template may be associated with a specific statistical language script, though this is merely optional. For example, a statistical language template having a graphical output of the production of a company unit may be associated with a corresponding statistical language script for such a graphical output. Of course other statistical language scripts and corresponding statistical language scripts may be used.

In some implementations, the reporting application may parse the specified script for one or more script parameter names (step 730). As noted above, the specified statistical language script may include one or more documented script parameters that the reporting application may retrieve. In some versions, the reporting application may utilize the one or more documented parameters for a wizard or other user interface, such as that shown in FIG. 9, for a user to specify values.

In some implementations, a user may specify a value for each of the one or more parameters (step 740). As will be described in greater detail below in reference to FIG. 9, in some versions the user may specify a value for the one or more parameters using a wizard or other user interface. In some instances, default values or predetermined values may be presented to the user. For example, a date parameter may have one or more predetermined values. By way of example only, a parameter for a date range may include one or more predetermined list of values corresponding to a fiscal year, year-to-date, current month, previous month, previous three months, previous six months, previous year, previous three years, previous five years, previous ten years, etc. Of course other parameters and corresponding predetermined values may be provided as well. In other versions, the user may manually specify one or more values for the one or more parameters. For example, the user may manually enter the one or more values into the URI, such as URI 610 described above.

As noted above, one or more script parameter values may be determined based on a reporting application formula expression. These formula expressions may be associated via a report formula function with a report grouping, such as by a specific sales person, by a region, by a state, etc. Thus, when the report's parameter values are prompted for and/or the report's formulas are evaluated, the URI's 610 set of paired script parameter names and values will include the context-aware group level information. For example, a statistical language script with a filterByGroup script parameter allows the script's output to match the report's group level. The output of this script may be a Texas sales graph when the filterByGroup script parameter is associated, via the context-aware formula function evaluation, with the report's state-level grouping information for the group Texas. Similarly, the on-demand output of the statistical language script may next result in a Louisiana sales graph by having the filterByGroup parameter subsequently associated with the report group for Louisiana. By way of example only, a URI formula of "R:\\C:\scripts\getTimeSeriesForcast.R?state="+current-GroupLevel( ) may result in a URI of R:\\C:\scripts\getTimeSeriesForcast.R?state=Texas, where Texas is representative of what is returned by the report formula function "currentGroupLevel( )" based on the context awareness of the current group level. In some instances this may include one or more parameters based on the current group.

In some implementations, the user may specify a hostname and port for the statistical programming interface, such as statistical programming interface 520 of FIG. 5, (step 750). As will be described in greater detail below in reference to FIG. 9, in some versions the user may specify the hostname and port using a wizard or other user interface. In some instances, a default hostname and port may be provided if the user does not specify a hostname and port, such as localhost at 127.0.0.1. In some versions, a plurality of predetermined hostnames and/or ports may be provided. In other versions, a user may manually specify the hostname and/or port. For example, the user may manually enter the hostname and/or port into the URI, such as URI 610 described above.

In some implementations the reporting application may prepend the parameter names and values to the statistical language script (step 760). In one example implementation, the reporting application may loop over the part of the URI that encodes the list of parameter names and values such that each parameter name and value may be converted into the appropriate syntax for the statistical programming language. For example, for an R language implementation, the following pseudo code may be incorporated into the reporting application to convert the parameter names and values into the appropriate syntax for an R script:

```
Newline = '\n'
parameterString = ""
foreach crParam
{
parameterString.append (crParam.name + "<- " + rParam.value + newline)
}
result = evaluate(parameterString + rScript)
```

The foregoing may thus loop through and add the specified parameter names and values to the statistical programming language for use in analyzing a data set. Of course, other implementations for other statistical programming languages may be used. In some versions, the parameter names and values may be prepended to the script, while in others the parameter names and values are appended.

In some implementations, the script may be sent or otherwise transmitted to the statistical programming language interface (step 770). In some instances, such as when the statistical language interface is located on a remote device, the script may be transmitted via a network, such as network 120 of FIG. 1. In other instances, such as when the statistical language interface is located on the same device, the statistical programming interface may execute the script.

In some implementations, the statistical programming language interface fetches data from the database, such as databases 154, 530, and processes the data according to the script (step 780). By way of example only, the statistical programming language interface may include Rserve, JRI, R Caller, etc. Of course, other statistical programming language interfaces for other statistical programming languages may be used.

In some implementations, the statistical programming language interface generates an output based on the analyzed data from the script (step 790). In some versions, the generated output may include a graphical output, such as graphical output 400 shown in FIG. 4. In other versions the generated output may include a scalar value or a list of scalar values. As will be described below in reference to FIG. 8, in some implementations the graphical output may be generated having one or more graphic parameters based on a style of the reporting application, though this is merely optional.

In some implementations, the output generated from the analyzed data is sent or otherwise transmitted to the reporting application from the statistical programming language interface (step 800). In some instances, such as when the statistical language interface is located on a remote device, the generated output may be transmitted via a network, such as network 120 of FIG. 1. In other instances, such as when the statistical language interface is located on the same device, the generated output may be retrieved by the reporting application.

In some implementations, the reporting application may further process the received output (step 810). For example, a graphical output may be processed via an existing dynamic images code of Crystal Reports®. In some versions, the output may be cached based on the unique URI used to generate the output. Thus, for a statistical language script that generates a graphical output, such as graphical output 400, the graphical output may be stored and retrieved based on the cached copy without re-executing the statistical language script. In some implementations, the cached output may be incorporated within the report's file (e.g., there is no need to access a database or the Rserver to display the generated output within the report). The self-contained report file contains the full functional cache. If one or more parameter values are changed, then process 700 may return to step 760 to prepend the parameter names and values to the script and re-generate the new output. The new output can likewise be cached. Thus, even if a portion of a report generated by a reporting application is changed, if the parameters for the script remain the same, the cached generated output is presented in the report. Such caching may assist in reducing and/or eliminating expensive and/or time-consuming refreshes of the generated output when the values for the parameters have not changed.

In some implementations, a user function library (UFL) may be utilized with the foregoing process 700 for a scalar output from a statistical language script. By way of example only, a UFL getOutputFromR may be created and used with a URI similar to URI 610. The UFL getOutputFromR may use the URI as a single input and return the scalar output as determined by the statistical programming language. For instance, getOutputFromR("R:\\C:\scripts\getTimeSeriesForcast.R?epochtime=13454665600") has the input URI of R:\\C:\scripts\getTimeSeriesForcast.R?epochtime=13454665600 where the hostname and port are the localhost, C:\scripts\getTimeSeriesForcast.R is the statistical language script, and a parameter name epochtime has a value of 13454665600. In this example, a returned scalar output may be a value, such as 42,000. Of course, other UFLs and/or other configurations to return scalar outputs may be implemented or used.

It should be understood that one or more of the foregoing steps of process 700 may be omitted, rearranged, and/or otherwise adjusted in some implementations. For example, step 750 may be rearranged such that step 750 occurs before steps 720, 730, 740. In some implementations, the output of a single script may be integrated in a single report multiple times and/or the outputs of multiple scripts may be integrated into a single report. In addition, it should be understood that the integration of the output of a statistical language script may be implemented into existing reports (e.g., a graphical output may be added to an existing report). Furthermore, once the output, such as graphical output 400, is generated for the report, the report may continue to include this output based on the cached generated output (e.g., a report having a graphical output may be viewable in older versions of a reporting application and/or via a viewing-only program due to the cached generated output).

In some versions, additional steps may be added to process 700. For example, style information from the reporting application may be passed from the reporting application and implemented in the statistical language script such that the generated output based on the script may have a similar color, font, texture, etc. as the report of the reporting application.

Figure 8:
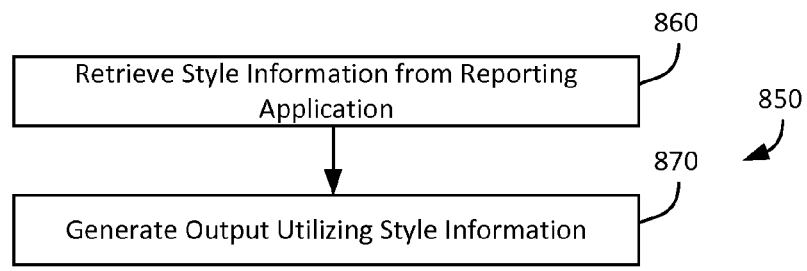
FIG. 8 is a flow diagram of a process for generating an output utilizing style information from a report.

Referring to FIG. 8, process 850 may include retrieving style information from the reporting application (step 860) and generating an output utilizing the style information (step 870). It should be understood that steps 860, 870 may be implemented in process 700. One example of including style information from the reporting application into the generated output for the R language may include using a Par( ) function.

By way of example only, to generate a graphical output having a similar background color as the report created in the reporting application, an example Par( ) function may be Par(col=calculateRcolor(report.getstyle( ).getBackgroundColor( ))). Of course other style elements may be included, such as fonts, textures, etc. In some versions, if a style is not included in the report element level, a parent style value may be passed using the Par( ) function. Of course other implementations using other statistical programming languages may be used as well.

In some implementations, process 700 of FIG. 7 may be integrated into a recurring process such that a daily, weekly, monthly, and/or other periodic report may be generated. For example, a time-based job scheduler (e.g., a cron job, a schedule object in SAP® Business Intelligence Platform, publishing and scheduling using BusinessObjects Enterprise™, or the like) may be configured to run a report having an embedded statistical language template on a periodic basis to produce a generated output for a user for each period. By way of example only, such a recurring process may be used to generate a graphical output of data from a database on a daily basis to be included in a daily e-mail. Of course other implementations may be provided.

In the example described in reference to FIG. 7, if a statistical language script does not provide documentation of the one or more parameters and/or generates more than a single output, the reporting application may be configured to generate an error. Such an error may be a placeholder image indicating the error and/or to produce a formula exception when the statistical programming language integration fails.

E. Example User Interface

Referring to FIG. 9, an example user interface 900 that may be utilized for inputting one or more of the elements for a URI, such as URI 610, is shown. In the present example, and entry field 910 is provided for input of the hostname for the URI. In some instances, entry field 910 may be a text box into which a user may type the hostname and/or in some versions entry field 910 may include a dropdown menu from which a user may select a hostname from a list of predetermined hostnames. In some versions, entry field 910 may be prepopulated with a default entry, such as localhost and/or otherwise. Similarly, entry field 920 is provided for input of the port for the URI. In some instances, entry field 920 may be a text box into which a user may type the hostname and/or in some versions entry field 920 may include a dropdown menu from which a user may select a port from a list of predetermined ports. In some versions, entry field 920 may be prepopulated with a default entry and/or otherwise based on the hostname indicated in entry field 910 and/or based on a default setting. In still other versions, entry field 920 may be omitted. Entry field 930 is provided for input of the location of the statistical language script for the URI. In some instances, entry field 930 may be a text box into which a user may type the location of the script and/or in some versions entry field 930 may include a dropdown menu from which a user may select an identified script from a list of predetermined scripts. In still further versions, an "Open File" dialog box may be presented to the user for the user to navigate through folders and/or files to select a desired statistical language script for entry field 930. Entry fields 940 are provided for input of parameter values of the statistical language script for the URI. In the present example, each entry field 940 comprises a parameter name portion 942 and a value portion 944. In some versions, parameter name portion 942 may be populated with the identified parameter names when a reporting application parses the specified script, such as during process 700 discussed above. Accordingly, the user may need only input the value into value portion 944 for each identified parameter name. The parsing of the specified script may occur when the script is identified in entry field 930, though this is merely optional. In other versions, the user may manually identify the parameter names in parameter name portion 942, though this is merely optional. Of course other entry fields and/or other features may be included with user interface 900.

In some versions, user interface 900 may separately present entry fields 910, 920, 930, 940, 942, and/or 944. For example, fields 910, 920, 930, 940, 942, and/or 944 may be presented separately in any order during a wizard or other user interface. In some versions, user interface 900 may be presented to a user once a statistical programming language template is selected and inserted into a report, though this is optional. Of course other configurations may be implemented.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above-described techniques can be implemented on a computer having a display device. The display device can, for example, be a cathode ray tube (CRT) and/or a liquid crystal display (LCD) monitor. The interaction with a user can, for example, be a display of information to the user via a keyboard or a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Networks may include packet-based networks, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The client device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various non-transitory computer readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a non-transitory computer-readable storage medium. Non-transitory computer-readable storage media can be non-transitory in nature and can include both computer storage media and communication media including any medium that facilitates transfer of a computer program from one place to another. A storage media can be any available media that can be accessed by a computer. By way of example, and not limitation, such non-transitory computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a non-transitory computer-readable storage medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of non-transitory computer-readable storage media.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for integrating an output of a statistical language script for a reporting application, the method comprising:
    receiving, by one or more processors, a location of the statistical language script via an interface of the reporting application;
    receiving, by one or more processors, one or more values for one or more parameters of the statistical language script, a value for a parameter of the one or more parameters based on data generated by the reporting application;
    associating, using one or more processors, the statistical language script and the one or more values for the one or more parameters with a uniform resource indicator;
    modifying, using one or more processors, the statistical language script to associate the one or more parameters with the received one or more values; outputting, using one or more processors, the modified statistical language script to a statistical programming language interface;
    receiving, by one or more processors, an output from the statistical programming language interface responsive to the statistical programming language interface executing the modified statistical language script and using data retrieved from a database; and
    integrating, using one or more processors, the output of the statistical language script into an existing report associated with the reporting application.

2. The method of claim 1 further comprising:
    receiving, by one or more processors, a location of a statistical programming language interface via the interface of the reporting application, wherein the location comprises a hostname and a port; and
    associating, by one or more processors, the location of the hostname and port with the uniform resource identifier.

3. The method of claim 2, wherein the output comprises a graphical output.

4. The method of claim 3, wherein the graphical output comprises a raster format image.

5. The method of claim 2, wherein the output comprises a scalar value.

6. The method of claim 2, wherein the statistical language script comprises an R script.

7. The method of claim 1 further comprising:
    parsing, using one or more processors, the statistical language script for one or more parameters.

8. The method of claim 1 further comprising:
    outputting, using one or more processors, display data for presenting the interface to a user, wherein the interface comprises one or more entry fields, wherein at least one entry field is associated with a location of the statistical language script.

9. The method of claim 1 further comprising:
    caching, by one or more processors, the output, wherein the cached output is associated with the uniform resource indicator.

10. The method of claim 1 further comprising:
    receiving, by one or more processors one or more style parameters of the existing report associated with the reporting application; and
    modifying, using one or more processors, the statistical language script to generate the output in accordance with the one or more style parameters.

11. The method of claim 1, wherein the step of modifying the statistical language script to associate the one or more parameters with the one or more identified values comprises prepending code to the statistical language script for assigning the one or more identified values to the one or more parameters.

12. A computer-implemented method for presenting a graphical output of a statistical language script within a report constructed by a reporting application comprising:

associating a template for presenting a graphical output of a statistical language script within an existing report of the reporting application;

identifying a location of the statistical language script via an interface of the reporting application;

parsing the statistical language script for one or more parameter names;

identifying a value for each of the one or more parameter names, a first value of a first parameter name based on evaluating a formula expression of the existing report;

identifying a location of a statistical programming language interface, wherein the location of the statistical programming language interface comprises a hostname and a port;

associating the hostname, the port, the location of the statistical language script, and the one or more parameter names and values with a uniform resource identifier;

modifying the statistical language script to associate the one or more parameter names with the one or more identified values;

outputting the statistical language script to the statistical programming language interface;

receiving the graphical output from the statistical programming language interface responsive to the statistical programming language interface executing the modified statistical language script and using data retrieved from a database; and integrating the graphical output with template of the existing report.

13. The method of claim 12 further comprising:

caching the graphical output, wherein the cached graphical output is associated with the uniform resource identifier.

14. The method of claim 13, wherein the step of modifying the statistical language script to associate the one or more parameter names with the one or more identified values comprises prepending code to the statistical language script for assigning the one or more identified values to the one or more parameter names.

15. The method of claim 14 further comprising:

identifying one or more style parameters of the existing report; and modifying the statistical language script to generate the graphical output in accordance with the one or more identified style parameters.

16. The method of claim 12, wherein the graphical output comprises a raster format image.

17. The method of claim 12, wherein the statistical language script comprises an R script.

18. The method of claim 12, wherein the hostname, the port, the location of the statistical language script, and a second value for a second parameter name of the one or more parameter names are identified by a user by inputting the hostname, the port, the location of the statistical language script, and the second value for the second parameter name of the one or more parameter names into the interface.

19. The method of claim 18, wherein the user interface comprises a wizard.

20. A system comprising:

a tangible computer-readable storage device comprising instructions; and one or more processors coupled to the tangible computer-readable storage device and configured to execute the instructions to perform operations comprising:

associating a template for presenting a graphical output of a statistical language script within an existing report of a reporting application;

identifying a location of the statistical language script via an interface of the reporting application;

parsing the statistical language script for one or more parameter names;

identifying a value for each of the one or more parameter names, a first value of a first parameter name determined based on evaluating a reporting application formula for a report grouping;

identifying a location of a statistical programming language interface, wherein the location of the statistical programming language interface comprises a hostname and a port;

associating the hostname, the port, the location of the statistical language script, and the one or more parameter names and values with a uniform resource indicator;

modifying the statistical language script to associate the one or more parameter names with the one or more identified values;

outputting the modified statistical language script to the statistical programming language interface;

receiving the graphical output from the statistical programming language interface responsive to the statistical programming language interface executing the modified statistical language script and using data retrieved from a database; and integrating the graphical output with the template of the existing report.

* * * * *